Sept. 17, 1968 W. A. REANEY 3,401,562
MATERIAL LEVEL INDICATOR
Filed July 20, 1966 2 Sheets-Sheet 1
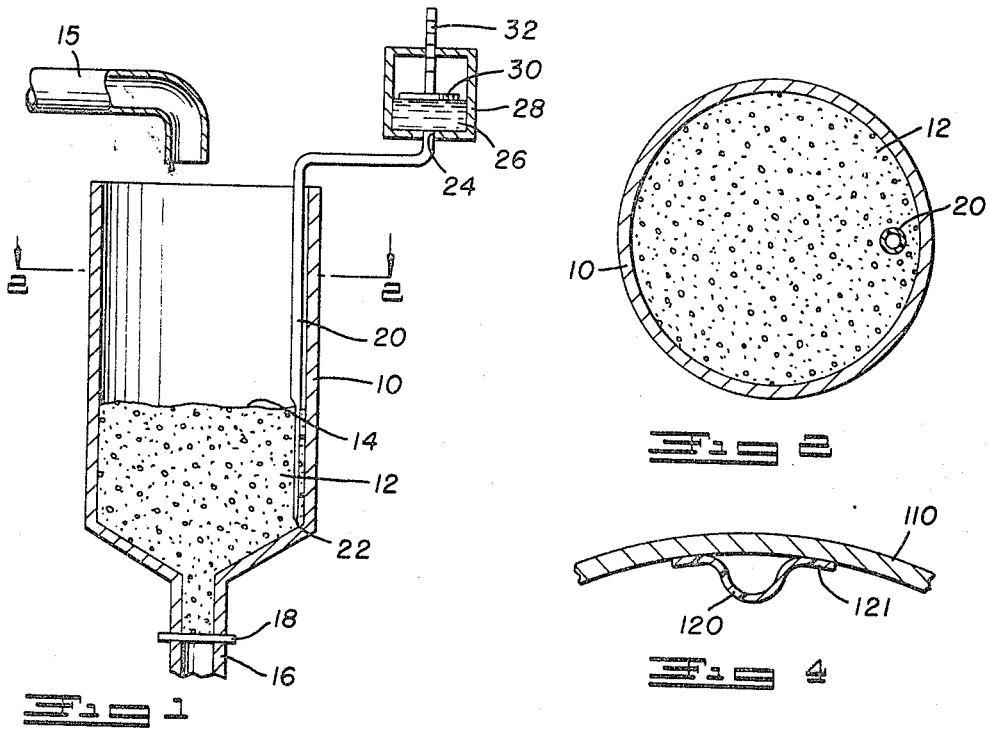
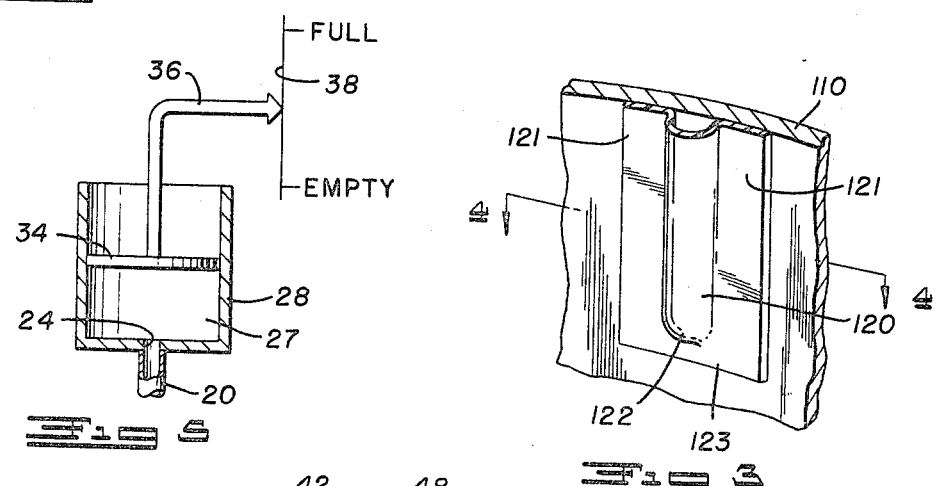
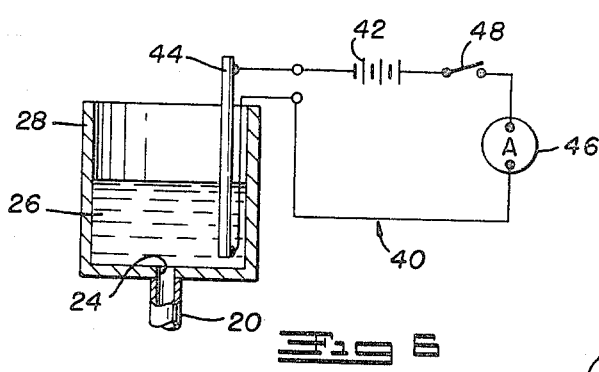
INVENTOR.
WARFORD A. REANEY
BY
Cox & Sheridan
ATTORNEYS

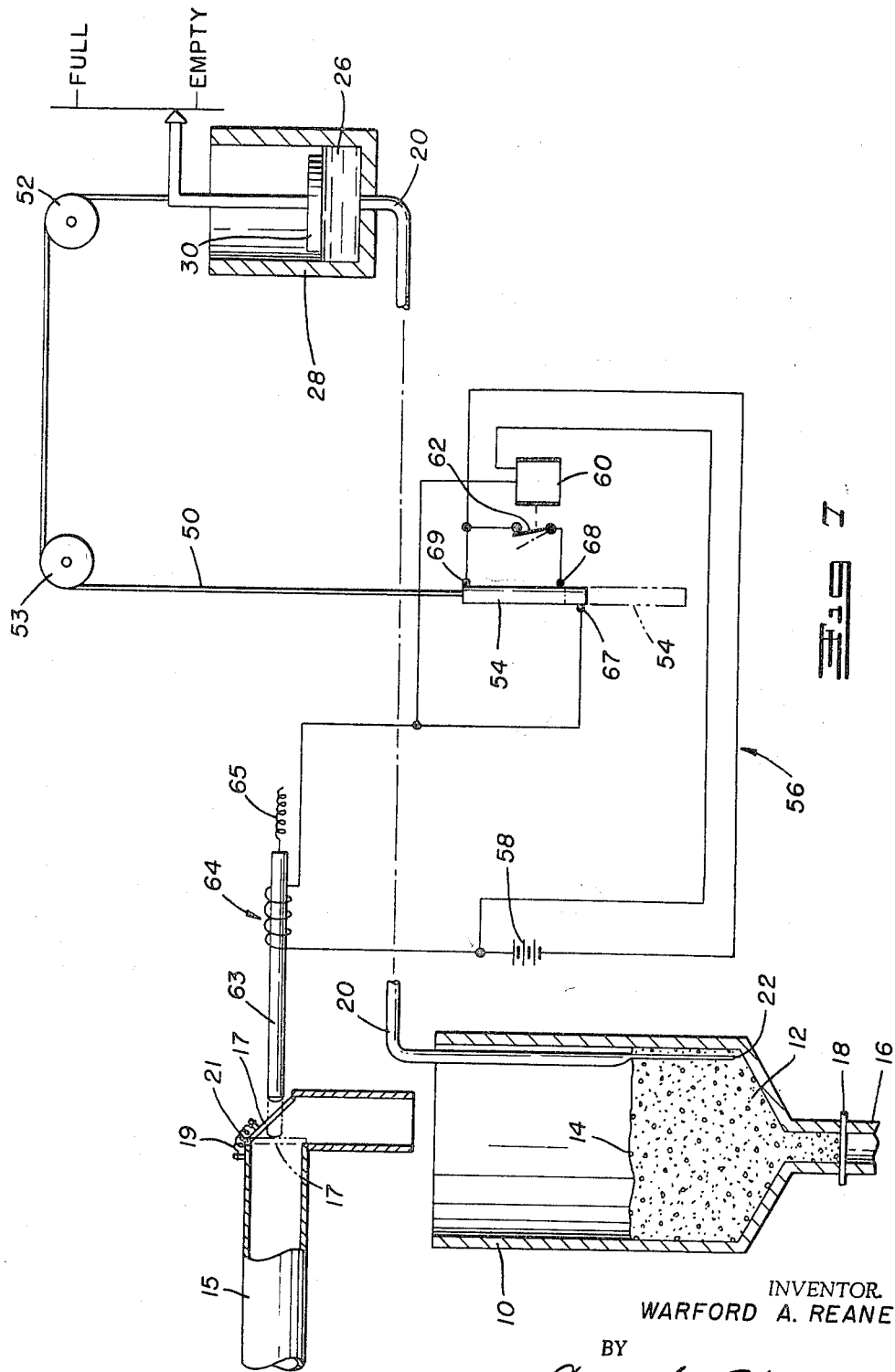

United States Patent Office 3,401,562
Patented Sept. 17, 1968

3,401,562
MATERIAL LEVEL INDICATOR
Warford A. Reaney, Box 338,
Delaware, Ohio 43015
Filed July 20, 1966, Ser. No. 566,627
8 Claims. (Cl. 73—290)

ABSTRACT OF THE DISCLOSURE

This invention relates to a device for measuring or indicating the height of solid material in a bin or similar container. More specifically the invention deals with a device for measuring or indicating the height or level of solid material in a bin which device comprises a resilient, fluid-filled tube, the latter being vertically disposed in the bin. The fluid in the resilient tube, when displaced by the lateral pressure of the solid material, operates a float, piston, or similar element in a cooperating indicating device in a manner correlatable with changes in the level of material in the bin. The float, piston, or similar element may, in turn, operate a regulation system that controls the amount of solid material in the bin.

Background of the invention

Devices for measuring the level of a liquid in a tank seem to be plentiful but there appears to be a scarcity of devices for measuring the level of a solid material in a bin. By the term "solid material" is meant any solid material in the form of granules, powder, flakes, and the like. I am particularly interested in the storage of lime and limestone in bins but other solids such as grains, sand, plastic articles and the like are examples of solid materials which can be stored and measured by the device of my invention. L. W. T. Cummings, in Patent No. 2,696,-114, shows a method of measuring the level of solids in a container by means of forcing gas through the material and measuring the pressure drop across vertical increments by means of manometers spaced at various heights along the container. This method cannot be used where it is either undesirable or impossible to force gas through the material (a material which is adversely affected by air or moisture, for example) in the vessel or where it is economically unwise to provide the vessel with manometers.

There are prior devices which measure the liquid pressure and indicate the level of liquid in a tank by means of gas or liquid-filled membranes. However, these devices have not proven suitable for use in the measurement of the level of a solid. For example, K. Brown, in Patent No. 1,661,995, discloses a pneumatic system which indicates the level of a liquid in a tank by means of a hollow diaphragm, the latter operating a temperature-compensating, liquid-level gauge. The Brown structure is somewhat complicated since it involves the combination and cooperation of a gas-filled diaphragm located in the bottom of the tank; a second, separate cooperating diaphragm outside the tank; and interrelated gears for the operation of a gauge dial. Gauges which cooperate with submerged diaphragms are extremely difficult to calibrate, particularly when a solid material is used to press against the diaphragm, the tendency being for a small depth of solid to almost completely collapse the diaphragm while an equivalent amount of solid added to a partially filled bin has virtually no effect.

G. L. Lupfer, in Patent No. Re. 23,983, discloses a liquid level indicator which indicates the level of the liquid in the tank by utilizing a type of vertical manometer outside the tank with a diaphragm over each end of the manometer, the ends being inside the tank. Once again, this type of device does not contemplate the measurement of solid material in a bin and is inconvenient for such purpose, since the relatively fixed-position diaphragms disclosed therein cannot respond adequately to the complete variance in pressure caused by an increase or decrease in the amount of solid material in the tank.

Objects

It is, therefore, an object of my invention to provide a device for accurately measuring and indicating the level of solid material in a bin.

It is a further object of this invention to provide a device which overcomes, in the measurement of the level of solid material in a bin, the aforementioned problems and disadvantages inherent in the existing art.

It is an other object to provide a device for measuring and indicating the amount of solid material in a bin, which device is relatively simple in structure and operation and which device may be manufactured at comparatively low cost. It is a specific object to provide a device for measuring and indicating the level of solids in a bin, which device requires no adjustments when the type (specific gravity, etc.) of the solid material in the bin is changed.

It is a further object to provide a device which, in addition to measuring and indicating the level of solid material in a bin, regulates the amount of solid material present in the bin.

I have now found that the foregoing and related objects can be attained in a device comprising (1) a compressible, resilient tube suited for vertical disposition in a container, said tube having a closed lower end and an open upper end, and said tube adapted to be filled with a fluid; and (2) an indicating means cooperating with said open end, said indicating means being adapted to measure the volume of said fluid displaced from said tube when said tube is compressed by said solid material.

Further objects and features of my invention will be apparent from the following specification and claims when considered in connection with the accompanying drawings illustrating several embodiments of my invention.

Drawings

In the drawings:

FIG. 1 is a vertical cross-section of a bin with my material level indicator attached;

FIG. 2 is a horizontal cross-section taken along the line 2—2 of FIG. 1;

FIG. 3 is a fragmentary view in perspective of the inside wall of a bin showing an alternative embodiment of the invention;

FIG. 4 is a horizontal cross-section of the wall of the bin taken substantially along the line 4—4 of FIG. 3;

FIG. 5 is a vertical cross-section through a cylinder and shows a further embodiment of the indicating portion of the device;

FIG. 6 is a vertical cross-section through a cylinder and shows still another embodiment of the indicating portion of the device; and FIG. 7 is a vertical cross-section of a bin similar to that shown in FIG. 1 having my material indicator attached and also having a regulation system according to my invention.

Turning now to the specific embodiments of the invention selected for illustration in the drawings and with specific reference to FIGS. 1 and 2, a bin 10 is shown partially filled with a solid material 12 to the level 14. Solid matter 12 enters bin 10 via inlet pipe 15, and is removed via outlet pipe 16 and valve 18.

A compressible, resilient tube 20 with closed lower end 22 and open upper end 24 is filled with a fluid 26 (in FIG. 1 a liquid) and is in fluid communication with vessel 28, said vessel being adapted to contain the volume of fluid 26 displaced from tube 20. A float 30 rides on the surface of the liquid 26 and a graduated bar 32, secured to the float 30, indicates the liquid level in the vessel 28 and hence the level 14 of solid material 12.

For purposes of regulation of the amount of solid material 12 in bin 10, I utilize at times a material level regulation system in combination with pressure responsive device 30 and inlet pipe 15 as shown in FIG. 7. The regulation system comprises cord 50, pulleys 52 and 53, electrical conducting element 54, and an electrical circuit indicated generally by 56. Greater detail of the system will be presented in the operation.

The compressible, resilient tube 20 may assume the circular shape as shown in FIGS. 1 and 2, or it may take the form shown in FIGS. 3 and 4.

As shown in FIGS. 3 and 4, a resilient plastic sheet is attached to a bin 110 along the side edges 121 and base edge 123 of the sheet by means of a suitable adhesive so as to form a tube 120 with closed lower end 122. The tube 120, thus formed, has as walls a portion of the inner wall of the bin 110 as well as a portion of the plastic sheet.

FIG. 5 shows another embodiment of the indicating device (alternative to that shown in FIG. 1) to be used in connection with vessel 28. This embodiment is preferable if the fluid contained in the tube 20 is a gas 27. The device of FIG. 5 consists of a piston 34 with an attached pointer 36. The tip of pointer 36 indicates the level of the solid material in the bin by its position relative to a graduated scale 38.

The indicating device shown in FIG. 6 using the rising column of displaced liquid from tube 20 to alter the conductivity of an electrical circuit, indicated generally by 40. The circuit 40 comprises a voltage source 42, a resistance bar 44, an ammeter 46 and a switch 48. The resistance bar 44, an ammeter 46 and a switch 48. The resistance bar 44 is positioned vertically in vessel 28 and transmits very little current when the vessel 28 is empty. However, as liquid 26 rises, it provides a more conductive path for the current than the bar 44 and the resistance in the circuit is reduced. The resulting increased current indicated by the ammeter 46 indicates the level of solid material 12 in the bin 10. During periods when the indicating device is not being used, switch 48 may be left open. The level of solid material, in terms of electrical units, is read on the meter 46.

Operation

In operation, the compressible, resilient tube 20 is vertically positioned in an empty bin 10, such that the closed end 22 is at or near the bottom of the bin 10. If the plastic sheet is used (as shown in FIG. 3) it is also positioned vertically in an empty bin 110 along an inside wall and attached to the wall in a suitable manner such that it forms a hollow column or tube 120. The open upper end 24 of the tube 20 is then connected with a container or vessel 28 such that the fluid 26 to be placed in the vessel 28 will at all times be in fluid communication with that to be placed in the tube 20. A fluid 26 is then injected into the tube-vessel system such that the tube 20 is filled and the vessel 28 is partially filled so that the float 30 as in FIG. 1 (or piston 34 as in FIG. 5 in the case of the fluid being a gas), will raise the graduated bar 32 (or pointer 36) to the point where the "empty" mark will appear just above the top of the vessel 28.

The bin 10 is then filled. While the bin is filling, the incoming material 12 will successively displace more fluid 26 in the tube 20 by collapsing the tube, beginning at the bottom 22 of the tube 20 and working upwardly. The fluid 26 thus displaced forces the fluid level in the vessel 28 to rise. Concurrently, the float 30 rises with the fluid 26. When the bin 10 is full the float 30 will have raised the graduated bar 32 to the point where the "full" mark appears just above the top of the vessel 28.

When the material level regulation system shown in FIG. 7 is used, cord 50 at one end is attached to a fluid level responsive device 30 which may be a float or graduated bar or a pointer. The cord 50 is extended over pulleys 52 and 53. Attached to the other end of cord 50 is an electrical conducting element 54. Element or bar 54 controls the flow of electricity from a power source 58 through the various paths of circuit 56 by means of changing its position vertically relative to the change in position of float 30.

When the bin 10 is filled with solid material 12 to its greatest desired extent, vessel 28 should contain its greatest volume of fluid 26. Consequently, float 30 will be in its highest position and bar 54 will be in its lowest position.

In its lowest position bar 54 makes contact with contact point 67 only. When bar 54 is in this position no current is flowing through any part of circuit 56, switch 62 is open, the hinged door 17 is closed as shown in dotted lines in FIG. 7, and solenoid pole 63 is in direct contact with hinged door 17 (also as shown in dotted lines in FIG. 7), thus preventing the flow of solid material 12 through inlet pipe 15. Solenoid rod 63 is held in place against hinged door 17 by the force of spring 65, which force is greater than that exerted by spring 19 which tends to hold door 17 in an open position.

When an amount of solid material 12 is removed through outlet pipe 16, the level of fluid in vessel 28 is lowered corresponding to the drop in the level 14 of solid material 12. Concurrently, float 30 is lowered and bar 54 is raised so that it immediately comes into contact with contact point 68 while still maintaining its contact with contact point 67. When bar 54 is in this position there is still no current flowing in circuit 56. It is only when the level 14 of solid material 12 reaches its lowest desired extent, and hence, float 30 reaches its lowest extent, that current will begin to flow through circuit 56. When float 30 reaches its lowest position bar 54 reaches its highest position and comes into contact with contact point 69. Only when bar 54 comes into contact with contact points 67, 68, and 69 will current being to flow in circuit 56. At this time relay 60 is activated and thus switch 62 is closed. Also, at this time, solenoid, 64 is activated, thus pulling solenond rod 63 away from hinged door 17. The force of activated solenoid 64 on solenoid rod 63 is sufficient to overcome the force exerted on rod 63 by spring 65. When solenoid rod 63 is removed from contact with hinged door 17, spring 19 acts to open door 17 by means of hinge 21.

With door 17 open, inlet pipe 15 begins to fill bin 10 with solid material 12. Consequently, float 30 travels upward and bar 54 downward. Contact between bar 54 and contact point 69 is thus broken. However, current is still flowing through relay 60 and solenoid 64 because switch 62 is closed. As a result inlet pipe 15 continues to fill bin 10 and bar 54 continues to descend until level 14 of solid material 12 reaches its highest desired level. At this point in time, bar 54 has descended far enough so that it breaks contact with contact point 68. When that contact is broken no current flows through the circuit 56, switch 62 opens, solenoid pole 63 closes door 17 by action of spring 65, and the cycle begins again as described, thus stopping the incoming solid material 12.

The piston device illustrated in FIG. 5 operates on the same principle of fluid displacement as does the float 30 illustrated in FIG. 1; except that the piston is raised by gas pressure whereas the float is raised by the buoyancy of a liquid. Again the device is easily calibrated by marking an "empty" position on scale 38 when the bin 10 is empty and marking a "full" position on scale 38, when the bin is full. The scale is then readily calibrated for any position between empty and full.

The advantages of my invention stem largely from the fact that the solid material being measured displaces a measurable quantity of fluid and, further, displaces a quantity of fluid which is directly proportional to the height of the solid. Thus, no adjustment, or re-calibration, of the level indicator is necessary if the weight or physical form of the solid is altered.

It will be understood that the foregoing description and drawings of specific embodiments of my invention are for purposes of illustration only and changes may be made therein within the scope and spirit of the invention.

I claim:

1. A device for measuring the height of a solid material in a container, said device comprising:
   (1) a compressible, resilient tube suited for vertical disposition in said container, said tube having a closed lower end and an open upper end, said tube adapted to be filled with a fluid and said tube comprising a sheet, the side and base edges of which are sealed to the inner wall of said container in a manner such that a vertically disposed channel is formed between said sheet and said wall; and
   (2) an indicating means cooperating with said open end, said indicating means being adapted to measure the volume of said fluid displaced from said tube when said tube is compressed by said solid material.
2. The device of claim 1 wherein said fluid is a liquid.
3. The device of claim 1 wherein said fluid is water.
4. The device of claim 1 wherein said fluid is a gas.
5. The device of claim 1 wherein said fluid is air.
6. The device of claim 1 wherein said fluid is a liquid and said indicating means comprises:
   (1) a vessel, in liquid communication with said tube;
   (2) a float, adapted to rest on the surface of said liquid in said vessel and to move responsively to changes in height of said surface; and
   (3) a graduated scale cooperative with said float, the reading of said scale being calibrated in terms of height of said solid material.
7. The device of claim 1 wherein said fluid is a gas and said indicating means comprises:
   (1) a cylinder, in gaseous communication with said tube;
   (2) a piston, movable in said cylinder responsive to displacement of gas from said tube; and
   (3) a graduated scale cooperative with said piston, the reading on said scale being calibrated in terms of height of said solid material.
8. The device of claim 1 wherein said fluid is water and said indicating means comprises:
   (1) a vessel, in liquid communication with said tube, and
   (2) an electrical circuit, having as elements thereof, a power supply, a meter, and a resistance element; said resistance element being vertically disposed in said vessel whereby, as the water level in said vessel increases, the length of the path of current through said water becomes greater and the resistance of said circuit becomes less; the reading on said meter thereby indicating the level of said solid material.

References Cited

UNITED STATES PATENTS

| | | | |
|---|---|---|---|
| 411,510 | 9/1889 | Riley | 73—419 |
| 1,449,437 | 3/1923 | Obermaier | 73—398 XR |
| 2,382,695 | 8/1945 | De Giers | 73—299 |
| 2,541,576 | 2/1951 | Detuno | 73—301 |
| 2,702,477 | 2/1955 | Leone | 73—403 |
| 2,713,793 | 7/1955 | Andersen | 73—301 |
| 3,290,938 | 12/1966 | Miller | 73—290 |

DAVID SCHONBERG, *Primary Examiner.*

DONALD O. WOODIEL, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,401,562                 September 17, 1968

Warford A. Reaney

It is certified that error appears in the above identified patent and that said Letters Patent are hereby corrected as shown below:

Column 2, line 16, "an other" should read -- another --.
Column 3, line 32, "using" should read -- uses --; line 37, cancel "44, an ammeter 46 and a switch 48. The resistance bar".

Signed and sealed this 24th day of February 1970.

(SEAL)
Attest:

Edward M. Fletcher, Jr.            WILLIAM E. SCHUYLER, JR.
Attesting Officer                   Commissioner of Patents